(12) United States Patent
Boness et al.

(10) Patent No.: US 8,532,548 B2
(45) Date of Patent: Sep. 10, 2013

(54) METHOD FOR CALIBRATING A PRINTING MACHINE USING SEMI-TRANSPARENT SHEETS

(75) Inventors: Jan D. Boness, Bad Bramstedt (DE); Heiko Hunold, Wattenbeck (DE); Frank Pierel, Gettorf (DE); Stefan Schrader, Kiel (DE)

(73) Assignee: Eastman Kodak Company, Rochester, NY (US)

( * ) Notice: Subject to any disclaimer, the term of this patent is extended or adjusted under 35 U.S.C. 154(b) by 324 days.

(21) Appl. No.: 12/993,105

(22) PCT Filed: May 6, 2009

(86) PCT No.: PCT/EP2009/055493
§ 371 (c)(1),
(2), (4) Date: Mar. 22, 2011

(87) PCT Pub. No.: WO2009/141230
PCT Pub. Date: Nov. 26, 2009

(65) Prior Publication Data
US 2011/0200366 A1    Aug. 18, 2011

(30) Foreign Application Priority Data
May 19, 2008    (DE) .................. 10 2008 024 216

(51) Int. Cl.
*G03G 15/01*    (2006.01)
*G03G 15/00*    (2006.01)

(52) U.S. Cl.
USPC .......................................... 399/301; 399/401

(58) Field of Classification Search
USPC ................................. 399/49, 72, 401, 301, 15
See application file for complete search history.

(56) References Cited

U.S. PATENT DOCUMENTS
2005/0179770 A1    8/2005    Bradley et al.
2008/0050132 A1    2/2008    Boness et al.

FOREIGN PATENT DOCUMENTS
| AU | 2005202009 A1 | 1/2006 |
| EP | 1 292 115 A2 | 3/2003 |
| EP | 1 418 142 A2 | 5/2004 |
| JP | 11157148 A * | 6/1999 |
| WO | WO 2005/077658 | 8/2005 |

* cited by examiner

Primary Examiner — Susan Lee
(74) Attorney, Agent, or Firm — Christopher J. White; Kevin E. Spaulding

(57) ABSTRACT

A method for calibrating a printing machine having a plurality of printing units includes transporting a first group of at-least-semi-transparent sheets at least once through the printing units. A second group of at-least-semi-transparent sheets is transported at least twice through the printing units, with the sheets being turned over between passages. Registration marks are printed on one of the sheets of the first group of sheets, and on one of the sheets of the second group of sheets during their second passage through the printing units. No registration marks are printed on the sheets of the second group of sheets during their first passage through the printing units. The registration marks are measured at a registration sensor located downstream of the printing units. Calibration parameters are determined using the measurements of the first and second registration marks provided by the registration sensor.

8 Claims, 3 Drawing Sheets

METHOD FOR CALIBRATING A PRINTING MACHINE USING SEMI-TRANSPARENT SHEETS

FIELD OF THE INVENTION

The present invention relates to a method for calibrating a printing machine, in particular a digital multi-color printing machine comprising a plurality of printing units.

BACKGROUND OF THE INVENTION

In the field of printing machines, the application of a printing image in correct positional arrangement on a printing substrate is of considerable importance regarding the printing quality. Any misaligned printing of one or more colors on the printing substrate is readily perceived by the human eye and felt to be distracting.

Therefore, it is generally known that printing machines are regularly calibrated. In particular, it may be necessary to perform a calibration for each printing substrate that is being used. This means, when different printing substrates are used, a calibration must be performed for each individual printing substrate.

For such a calibration, as a rule, a plurality of registration marks are printed on a transport belt of the printing machine and on the respective sheets of the printing substrate during a calibration process. If the printing machine comprises a duplex device, registration marks are printed on the front side (recto printing) as well as on the reverse side (verso printing) of the respective sheets and are subsequently measured by means of a registration sensor.

If the printing substrate is partially transparent, the calibration cannot be performed in its usual way because the registration marks printed on the front side may show through, thus impairing a measuring of the registration marks on the reverse side of the sheet by means of the registration sensor.

To solve this problem, application DE 10 2004 007 367 that goes back to the applicant has suggested a method wherein, while the front and reverse sides are being printed, the sheet is offset transverse to its transport direction through the printing machine in order to print the respective registration marks offset with respect to each other on the front and reverse sides of a sheet. This can prevent the measurement of the marks by means of the registration sensor from being disrupted; however, in part, this method is highly complex in view of the required offset of the sheet, and an appropriate device allowing sufficient transverse offset of the sheets must be provided.

SUMMARY OF THE INVENTION

Considering this prior art, it is the object of the present invention to provide a simplified method for calibrating a printing machine, in particular a digital multi-color printing machine comprising a plurality of printing units, said printing machine not requiring a transverse offset of the sheets to be printed.

In accordance with the invention, there is provided a method for calibrating a printing machine comprising a plurality of printing units, the method comprising:

transporting a first group of at-least-semi-transparent sheets at least once through the plurality of printing units;

transporting a second group of at-least-semi-transparent sheets at least twice through the plurality of printing units, with the sheets being turned over between passages;

printing a first registration mark on one of the sheets of the first group of sheets while the first group passes through the printing units;

measuring the first registration mark at a registration sensor located downstream of the plurality of printing units in the transport direction of the sheets;

printing a second registration mark on one of the sheets of the second group of sheets during their second passage through the printing units, wherein no registration marks are printed on the sheets of the second group of sheets during their first passage through the printing units;

measuring the second registration mark at the registration sensor; and determining calibration parameters using the measurements of the first and second registration marks provided by the registration sensor.

Various embodiments include the following: the transport of a first group of sheets of an at least semi-transparent type through the printing machine in such a manner that the sheets are moved at least once through the plurality of printing units; the transport of a second group of sheets of an at least semi-transparent type through the printing machine in such a manner that the sheets are moved at least twice through the plurality of printing units, with the sheets being turned over between the passages; the printing of at least one registration mark on one of the sheets of the first group of sheets during the first passage through the printing units; the measurement of the respective registration mark at a registration sensor located—in the transport direction of the sheets—downstream of the plurality of printing units; the printing of at least one registration mark on one of the sheets of the second group of sheets during the second passage through the printing units, with no registration marks being printed during the first passage; the measurement of the respective registration mark at the registration sensor located—in the transport direction of the sheets—downstream of the plurality of printing units; and the determination of the calibration parameters with the use of the thus obtained measured results of the registration sensor. Various embodiments do not require a transverse offset of the sheets and are also suitable for a calibration of the printing machine for at least semi-transparent sheets. Of course, the sheets may also be fully transparent.

In a preferred embodiment of the invention, the sheets of the first group, after the first passage through the plurality of printing units, are fed to a stacker of the printing machine, without another passage through the printing units. As a result of this, the calibration period is reduced because the sheets do not first move along a duplex path. In this embodiment, after the first passage through the plurality of printing units, the sheets of the first group are preferably moved through a fusing unit.

Preferably, after the first passage through the printing units, the sheets of the second group are moved through a fusing unit in order to be put into the same state that they would have if the front side had also been printed. To this end, the fusing unit is preferably operated in a fusing mode while the second group of sheets is being moved through said unit.

For a good calibration, preferably a plurality of registration marks is printed on the transport belt before the respective groups of sheets and subsequently measured by the registration sensor, with the measured results thus obtained being input in the determination of the calibration parameters. In a similar manner, preferably a plurality of registration marks is printed on a transport belt of the printing machine after the respective groups of sheets and subsequently measured by the registration sensor, with the measured results thus obtained being again input in the determination of the calibration parameters. In one embodiment of the invention, at least one registration mark is printed between each of the sheets of the respective groups on a transport belt of the printing machine and subsequently measured by the registration sensor, with the measured results thus obtained also being input in the determination of the calibration parameters.

BRIEF DESCRIPTION OF THE DRAWINGS

Hereinafter, the invention will be explained in greater detail with reference to a preferred exemplary embodiment of the invention and with reference to the drawings which show in FIG. 1 a schematic representation of a multi-color printing machine.

DETAILED DESCRIPTION OF THE INVENTION

Figure 1:
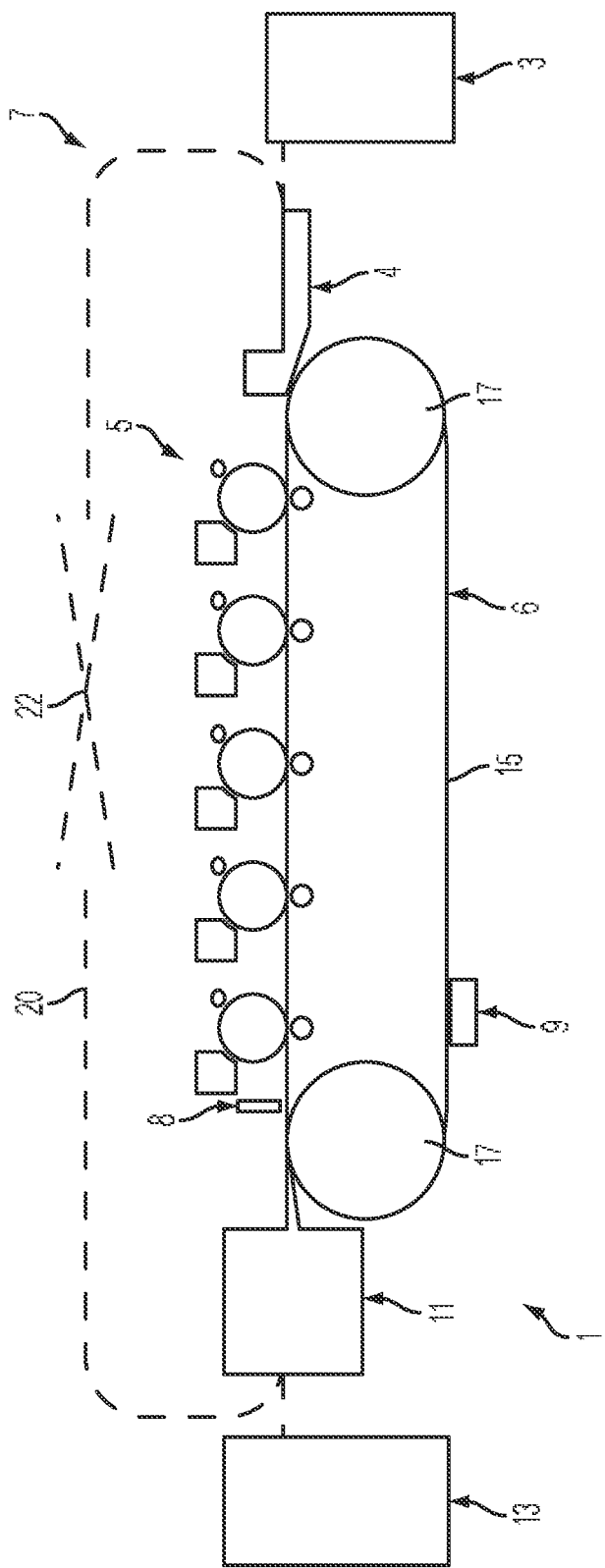

Positional and directional indications used in the description hereinafter relate to the representation in the drawings and are not intended to restrict the application in any way.

FIG. 1 shows a schematic representation of a multi-color printing machine 1 comprising a feeder 3, a positioning unit 4, a plurality of printing units 5, a first transport unit 6, a second transport unit 7, a registration sensor 8, a cleaning unit 9, a fusing unit 11 and a stacker 13.

The most diverse embodiments of such multi-color printing machines have been known, and FIG. 1 represents only a highly schematic example of such a machine.

The feeder 3 is disposed to receive a stack of sheets and to feed the individual sheets to the positioning unit 4 that will align a sheet in regard of its position in order to then move it on to the first transport unit 6. In a known manner, this alignment may comprise an in-track alignment (in the direction of movement of the sheet), a cross-track alignment (transverse to the direction of movement of the sheet) as well as a skew alignment (diagonal to the direction of movement of the sheet). The printing units 5 are of a type that is suitable to print the respective color separation images on the sheets located on the first transport unit 6. In the shown multi-color printing machine 1, five printing units 5 are shown, said printing units being operated, for example, with the colors Black, Cyan, Magenta, Yellow and a custom ink such as, for example, Clear DryInk. As is obvious to the person skilled in the art, it is also possible, of course, to use other colors, and the sequence of the colors in the printing units may be different from the aforementioned sequence. The printing units 5 are shown as electrophotographic printing units, however, they may also be printing units based on ink-jet technology or any other printing technology. The printing units 5 are located above the first transport unit 6.

The first transport unit 6 essentially comprises a transparent transport belt 15 that is guided so as to circulate around appropriate guide and/or drive rollers 17 in order to provide a closed path of movement. In particular the first transport unit 6 is intended to transport one of the sheets coming from the positioning unit 4 past the printing units 5 in the direction of the fusing unit 11 in order to allow a printing of the sheet by the printing units 5. The direct transport path of a sheet from the feeder 3 via the positioning unit 4 and the first transport unit 6 through the printing units 5 to the fusing unit 11 and the stacker 13 is referred to as a simplex path.

The second transport unit 7 forms a so-called duplex path that is represented by the dashed line 20. The crossed dashed lines 22 represent a sheet-turning unit inside the duplex path. The duplex path is provided in the known manner so as to receive a sheet at an end of the fusing unit 11 downstream in the direction of transport of a sheet and so as to return said sheet to the positioning unit 4 in order to return said sheet for a second printing. In order to permit a printing of the reverse side of the sheet, the turning unit is provided in the duplex path. The duplex path and the turning unit provided therein may have any suitable design that is not illustrated in detail here. However, the turning unit is preferably a unit wherein the lead edge of the sheet is maintained while the sheet is being turned. Although the duplex path is shown such that it extends around the printing units 5 at the top, it is also possible, of course, for said path to extend at the bottom around the transport unit 6.

The registration sensor 8 is an optical sensor that is directed at the transport belt 15 downstream of the printing units, viewed in the direction of rotation of the transport belt 15. Below the transport belt 15 is a reflector or white background (not illustrated) that is located opposite the registration sensor 8. The most diverse optical sensors may be used as the registration sensor 8. In one example, said sensor is a sensor that generates voltage signals corresponding to light-dark or dark-light transitions, said voltage signals being comparable with a prespecified threshold value and evaluated.

Viewed in the direction of circulation of the transport belt, the cleaning unit 9 is located downstream of the registration sensor 8 and comprises means that are suitable for cleaning the transport belt 15, such means being, for example, rotating brushes or stationary strippers.

Viewed in the direction of circulation of the transport belt 15, the fusing unit 11 is located downstream of the printing units 5 at an end of the first transport unit 6, said end being remote from the positioning unit 4, and is suitable for receiving printed sheets from the transport belt 15. Suitable means for fusing, for example, a toner applied by the electrophotographic printing units, are provided in the fusing unit. The stacker 13 is provided adjacent to the fusing unit 11 and is disposed to receive printed sheets.

During the operation of the multi-color printing machine 1, it is possible to print registration marks on the transport belt and, optionally, on the sheets present thereon, for various purposes such as, for example, calibration purposes or for the adjustment of the peripheral registration for a print job. These registration marks are then moved past the registration sensor 8 and detected in the known manner.

Figure 2:
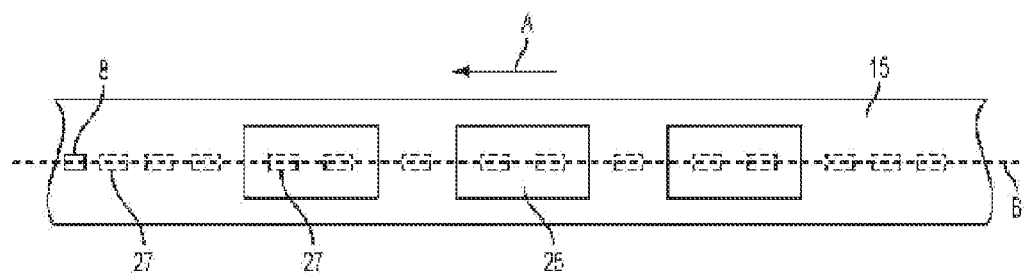
FIG. 2 a schematic plan view of a transport belt of the multi-color printing machine.

FIG. 2 is a schematic plan view of the transport belt 15, wherein, in order to simplify the illustration, no printing units are shown above the transport belt. The plan view shows only the registration sensor 8 next to the transport belt 15 as a part of the multi-color printing machine. The arrow A indicates the advance direction of the transport belt from right to left.

In accordance with the representation of FIG. 2, three sheets 25 forming a group can be seen on the transport belt as well as a plurality of virtual registration frames 27. During a calibration process of the multi-color printing machine, said process being explained hereinafter, registration marks are printed in these virtual registration frames. In practice, the number of sheets forming a group will, as a rule, deviate from the three shown sheets, and the exact number of sheets of such a group, as a rule, depends on the dimensions of the printing machine, as well as on the dimensions of the sheets themselves.

As is obvious from the plan view of FIG. 2, a plurality of virtual registration frames is positioned before and after the sheets 25 of the group, viewed in advance direction of the transport belt 15, one virtual registration frame 27 being positioned between each of the sheets 25 of the group, and two of the virtual registration frames being positioned on each of the sheets 25. In practice, the number of virtual registration frames in the respective positions before, after, between and on the sheets of the group may deviate from the shown number, whereby it may also be possible that no virtual registration frames at all are provided in some of these positions. The sheets, the virtual registration frames and also the registration sensor 8 are centered relative to a longitudinal axis B of the transport belt 15.

Figure 3:
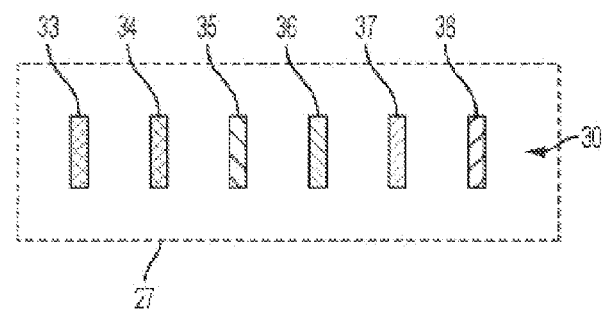
FIG. 3 a schematic representation of a registration mark.

FIG. 3 shows an example of a registration mark 30 consisting of registration lines 33 through 38 that are printed within a virtual registration frame 27. In the shown example, the registration mark 20 consists of two registration lines 33, 34 having the color Black, one registration line 35 having the color Cyan, one registration line 36 having the color Magenta, one registration line 37 having the color Yellow, as well as one registration line 38 having a custom color. The respective registration lines 33 through 38 are successively printed by the respective printing units 5. It is then possible for the registration sensor 8 to detect and evaluate the registration mark shown in FIG. 3 downstream of the last printing unit 5.

Figure 4:
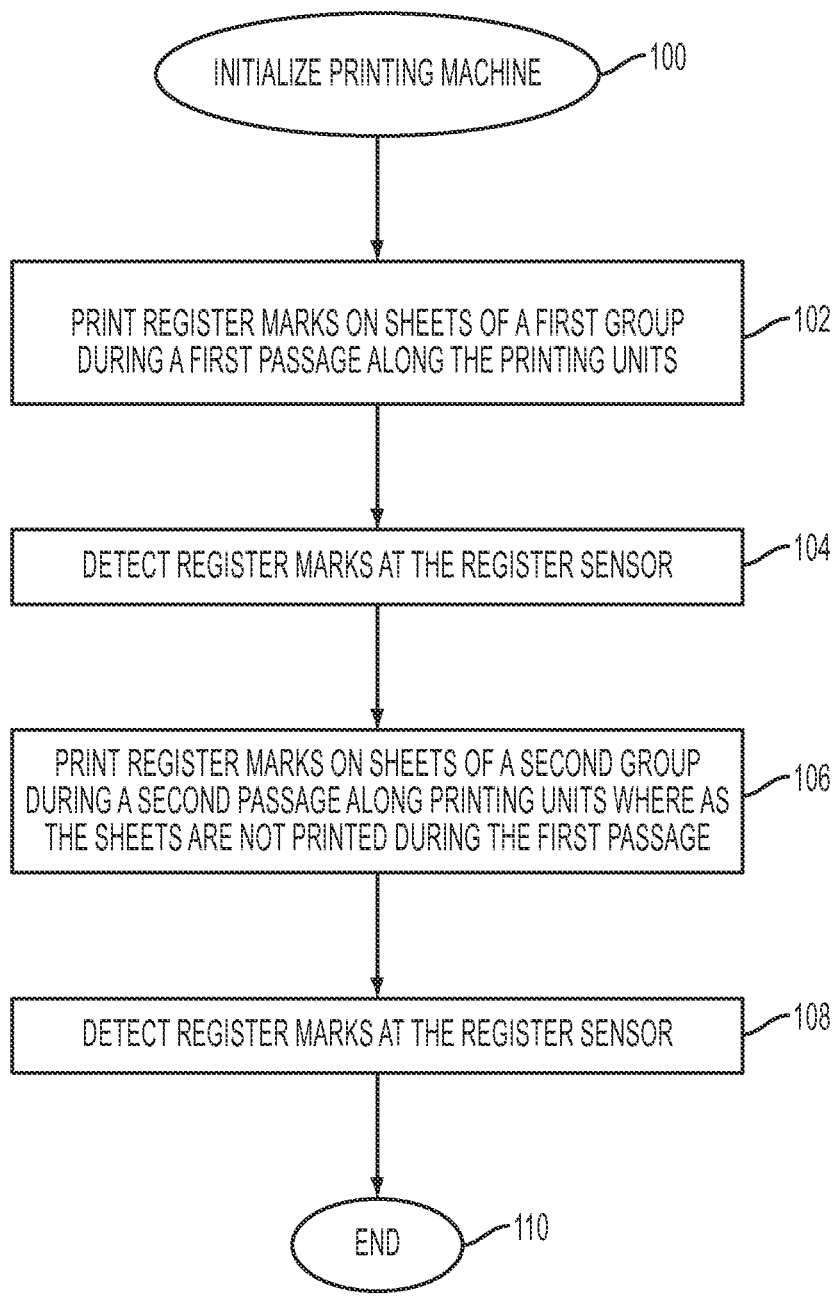
FIG. 4 a flow chart that shows an exemplary process during a calibration of the multi-color printing machine.

FIG. 4 shows a flow diagram of an example of a process for calibrating the multi-color printing machine for at least semi-transparent sheets that are to be printed. First, the printing machine is initialized in block 100, this comprising the input that the subsequent calibration routine is provided for at least semi-transparent sheets.

Thereafter, the process control moves on to block 102 where the registration marks are printed on the sheets of a first group. In particular, a first group of sheets from the feeder 3 is decollated and guided toward the stacker 13 via the positioning device 4, the first transport unit 6 and the fusing unit 11. In so doing, the respective printing units 5 print a first group of registration marks on the respective sheets. This additionally allows print registration marks to be printed on the transport belt as indicated in FIG. 2.

In block 104, the registration marks thus printed are subsequently detected by the registration sensor 8.

Thereafter, the process control moves on to block 106 where registration marks are printed in a specific manner on the sheets of a second group. In so doing, in particular a second group of sheets is transported out of the feeder 3 in order to be guided—via the positioning unit 4, the transport unit 6, the fusing unit 11, the second transport unit 7—back to the positioning unit 4, the first transport unit 6, the fusing unit 11 and finally to the stacker 13. In so doing, the sheets are passed twice through the printing units, said sheets being turned by an appropriate turning unit in the second transport unit 7 before the second passage. In accordance with block 108, the sheets are not printed by the printing units 5 during the first passage; however, during the second passage registration marks are printed on the sheets. During the second passage, registration marks may again be printed on the transport belt 15, i.e., in the same manner as illustrated by FIG. 2.

In block 108, the registration marks thus printed are then detected and measured by the registration sensor 8.

Subsequently, the process control moves on to block 110 where the calibration process is completed.

Preferably, the fusing unit 11 is operated in normal mode during the entire calibration process, so that the respective sheets are exposed to the fusing process by the fusing unit. Even though the sheets of the second group are not printed during the first passage through the printing units 5, the fusing unit 11 may change the properties of the individual sheet so that said sheets display the same properties during the second passage that they would have had if they had been printed during the first passage.

The invention has been explained in detail with reference to a preferred embodiment in accordance with the invention, without being restricted to the specifically illustrated embodiment.

In particular, the design of the printing machine 1 may differ from the depicted design. Also, it is not absolutely necessary that registration marks be printed in corresponding virtual registration frames 27 during the calibration process, as is shown by FIG. 2. Rather, the number of registration marks may be different from the number of virtual registration frames shown in FIG. 2. Of course, it is also possible to interchange the sequence of the groups of sheets or to guide them in an interleaved manner through the printing machine.

For example, the sheets of the second group may first be guided through the printing units and in the duplex path. While they are in the duplex path, the sheets of the first group are guided through the printing units and printed as previously described. Directly following this, the sheets of the second group coming out of the duplex path are printed by the printing units during said sheets' second passage.

The invention claimed is:

1. Method for calibrating a printing machine comprising a plurality of printing units, the method comprising:
    transporting a first group of at-least-semi-transparent sheets at least once through the plurality of printing units;
    transporting a second group of at-least-semi-transparent sheets at least twice through the plurality of printing units, with the sheets being turned over between passages;
    printing a first registration mark on one of the sheets of the first group of sheets while the first group passes through the printing units;
    measuring the first registration mark at a registration sensor located downstream of the plurality of printing units in the transport direction of the sheets;
    printing a second registration mark on one of the sheets of the second group of sheets during their second passage through the printing units, wherein no registration marks are printed on the sheets of the second group of sheets during their first passage through the printing units;
    measuring the second registration mark at the registration sensor; and
    determining calibration parameters using the measurements of the first and second registration marks provided by the registration sensor.

2. The method according to claim 1, further comprising feeding the sheets of the first group to a stacker of the printing machine after their first passage through the plurality of printing units, without an intervening passage through the printing units.

3. The method according to claim 1, further comprising moving the sheets of the first group through a fusing unit after their first passage through the plurality of printing units.

4. The method according to claim 1, further comprising moving the sheets of the second group through a fusing unit after their first passage through the plurality of printing units.

5. The method according to claim 4, wherein the fusing unit is operated in a fusing mode while the second group of sheets is being moved through the fusing unit.

6. The method according to claim 1, further comprising printing a plurality of third registration marks on a transport belt of the printing machine before the groups of sheets in the transport direction of the sheets, and measuring the plurality of third registration marks with the registration sensor, wherein the calibration parameters are further determined using the measurements of the third registration marks.

7. The method according to claim 1, further comprising printing a plurality of third registration marks on a transport belt of the printing machine after the groups of sheets in the transport direction of the sheets, and measuring the plurality of third registration marks with the registration sensor, wherein the calibration parameters are further determined using the measurements of the third registration marks.

8. The method according to claim 1, further including printing a third registration mark on a transport belt of the printing machine, and measuring the third registration mark with the registration sensor, wherein the calibration parameters are further determined using the measurement of the third registration mark.

* * * * *